(No Model.)
A. F. McALLISTER.
Machine for Filing Gin Saws.
No. 231,340. Patented Aug. 17, 1880.
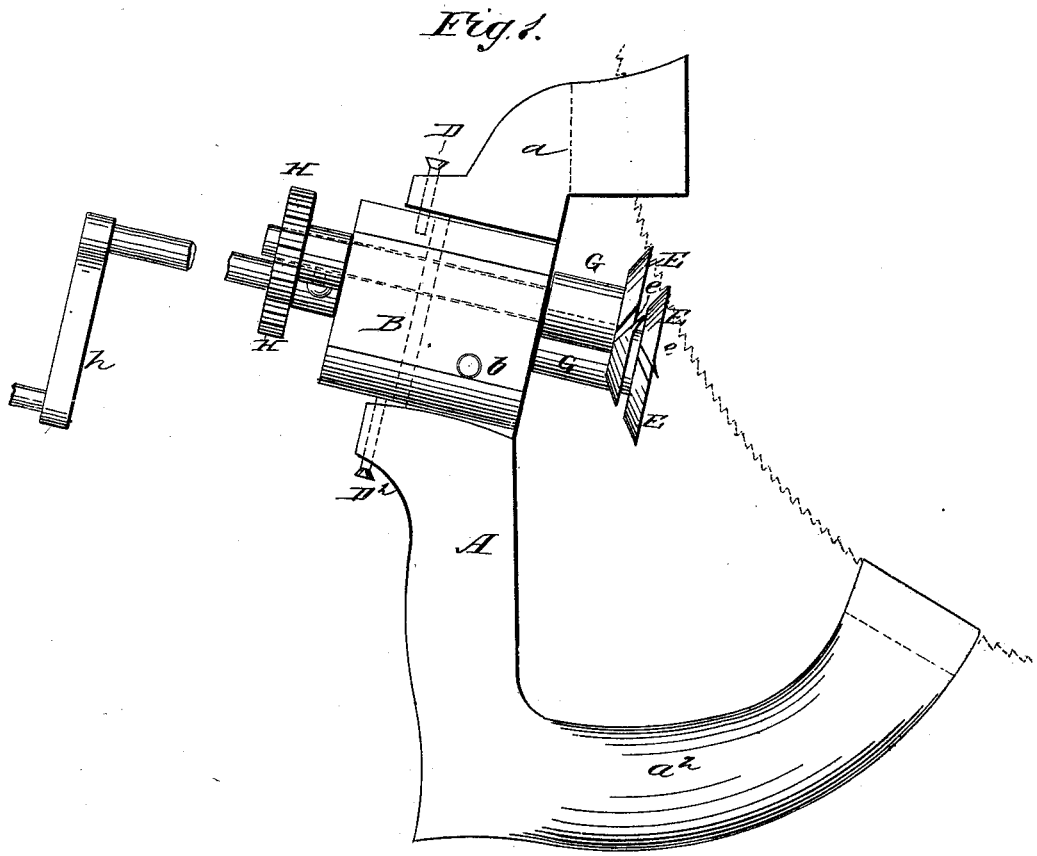
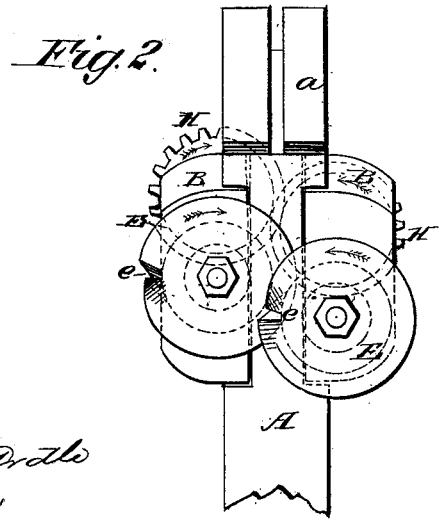
WITNESSES:
INVENTOR:
A. F. McAllister
BY
ATTORNEYS.

UNITED STATES PATENT OFFICE.

ALEXANDER F. McALLISTER, OF MARSHALL, TEXAS.

MACHINE FOR FILING GIN-SAWS.

SPECIFICATION forming part of Letters Patent No. 231,340, dated August 17, 1880.

Application filed May 17, 1880. (No model.)

*To all whom it may concern:*

Be it known that I, ALEXANDER F. McALLISTER, of Marshall, in the county of Harrison and State of Texas, have invented a new and useful Improvement in Machines for Filing Gin-Saws, of which the following is a specification.

My invention is more particularly intended for use in filing the teeth of cotton-gin saws, and will be first described in connection with the drawings, and then pointed out in the claim.

In the accompanying drawings, Figure 1 is a side view of an apparatus embodying my improvements, and Fig. 2 is a front view of the same.

Similar letters of reference indicate corresponding parts.

A represents a frame provided with two arms, $a\ a^2$, between which is pivoted a block, B, which carries the files. The ends of the arms are provided with notches for engagement with the saw-blade, in order to hold it while being filed. The arm $a^2$ is longer than the arm $a$, and is formed into a handle, by means of which the apparatus may be held to its work. The block B is formed with a fork or crotch, which straddles a narrowed portion of the frame between the arms, and is held in place by a bolt, $b$, which serves as a pivot, and allows it to oscillate when moved in one direction or the other by set-screws $D\ D^2$, working in the frame A. By this means the block B may be adjusted so as to change its angle of inclination with relation to the frame, in order to accommodate the files to different sizes of saws or different pitch of teeth.

The files consist of two bevel-faced wheels, E E, with file-teeth formed on their faces and on their sides, and each file is formed with a projecting lip, $e$, near the edge or periphery thereof. The files are carried by shafts G, which are provided with gearing H, so as to cause them to revolve toward each other, and one of said shafts is provided with a crank, $h$, for turning it.

The apparatus is held in one hand and is moved up to the saw so as to place the blade in the notches of the arms and engage the files E with the teeth of the saw, as illustrated in Fig. 1, in which the saw is shown in dotted lines. One of the files may be slightly in advance of the other, so that while one file is engaged with one tooth of the saw the other file engages a tooth to the rear thereof, as shown.

If desired, one of the files may have its teeth finer than the other, so as to put a finish on the tooth engaged by the first file.

The crank $h$ is turned so as to rotate the files. One revolution files a tooth, and then the lip $e$ engages the next tooth, after the manner of the engagement of a worm or endless screw with a gear wheel, and thus brings another tooth into position to be filed.

Having thus described my invention, I claim as new and desire to secure by Letters Patent—

The combination, with the hand-frame A, having notched arms $a\ a^2$, of the pivoted block B, having a fork that straddles a narrow portion of the frame between the arms, the set-screws $D\ D^2$, and the file-shafts G G, as and for the purpose described.

ALEXANDER F. McALLISTER.

Witnesses:
 COL. R. HAUGHTON,
 NEY McPHAIL.